| United States Patent [19]
Shuman

[11] B 3,923,855
[45] Dec. 2, 1975

[54] 2-SULFONYLOXYETHYL 3-TRIFLUOROMETHYLPHENOXY-4'-CHLOROPHENYL ACETATE

[75] Inventor: Richard F. Shuman, Westfield, N.J.

[73] Assignee: Merck & Co., Inc., Rahway, N.J.

[22] Filed: Oct. 26, 1973

[21] Appl. No.: 410,062

[44] Published under the Trial Voluntary Protest Program on January 28, 1975 as document no. B 410,062.

Related U.S. Application Data

[62] Division of Ser. No. 271,446, July 13, 1972, abandoned.

[52] U.S. Cl. ...... 260/456 R; 260/456 P; 260/473 R; 424/308
[51] Int. Cl.² ........................................ C07C 143/68
[58] Field of Search.......... 260/473 R, 456 R, 456 P

[56] References Cited
UNITED STATES PATENTS 3,378,582  4/1968  Bolhofer............................ 260/520
3,517,050  6/1970  Bolhofer......................... 260/473 R
3,517,051  6/1970  Bolhofer......................... 260/473 R

*Primary Examiner*—James O. Thomas
*Assistant Examiner*—Nicky Chan
*Attorney, Agent, or Firm*—Edmunde D. Riedl; J. Jerome Behan

[57]  ABSTRACT

A method for the preparation of 2-acetamidoethyl (3-trifluoromethylphenoxy)(4-chlorophenyl)acetate which comprises treating a 2-substituted ethyl (3-trifluoromethylphenoxy)(4-chlorophenyl)acetate with an N-substituted salt of acetamide. The 2-acetamidoethyl (3-trifluoromethylphenoxy)(4-chlorophenyl)acetate obtained is a hypocholesterolemic and hypolipemic agent which effectively reduces the concentration of cholesterol, triglycerides and other lipids in blood serum.

3 Claims, No Drawings

2-SULFONYLOXYETHYL 3-TRIFLUOROMETHYLPHENOXY-4'-CHLOROPHENYL ACETATE

This is a division of application Ser. No.271,446, filed July 13, 1972, now abandoned.

This invention relates to a novel method for the preparation of 2-acetamidoethyl (3-trifluoromethylphenoxy)- (4-chlorophenyl)acetate.

There is no clear agreement about the actual role of cholesterol and triglycerides in the localization of atherosclerotic plaques but numerous studies support the concept that cholesterol and triglycerides play a major role in the pathogenesis of atherosclerosis because along with other lipids and fibrin they accumulate in the arterial intima and subintima and produce arterial corrosion.

It is the purpose of this invention to describe a novel method for the preparation of 2-acetamidoethyl (3-trifluoromethylphenoxy) (4-chlorophenyl)acetate which product has proved effective in reducing the concentration of cholesterol, triglycerides and other lipids in blood serum. This compound induces a significant reduction in cholesterol and triglyceride levels in serum and it achieves this result with little or no irritation to the gastrointestinal tract.

According to this invention 2-acetamidoethyl (3-trifluoromethylphenoxy) (4-chlorophenyl)acetate is obtained by treating an appropriate 2-substituted ethyl (3-trifluoromethylphenoxy) (4-chlorophenyl)acetate (II) with an N-metallo salt of acetamide, for example, an alkali metal salt derived from sodium, lithium, potassium and the like or an alkaline earth metal salt such as magnesium and the like. This metallo salt may be prepared in situ by treating the acetamide with an alkali metal or an alkaline earth metal alkoxide, for example, an alkali metal or alkaline earth metal lower alkoxide such as sodium methoxide, lithium methoxide, potassium methoxide, magnesium methoxide and the like. An alkanol such as methanol, ethanol, propanol and the like, corresponding to the alkoxide portion of the alkali metal and alkaline earth metal alkoxide, is generally employed; for example, when a methoxide is employed the solvent is methanol. The reaction is conveniently conducted at the reflux temperature of the particular solvent employed. The following equation illustrates this method of preparation:

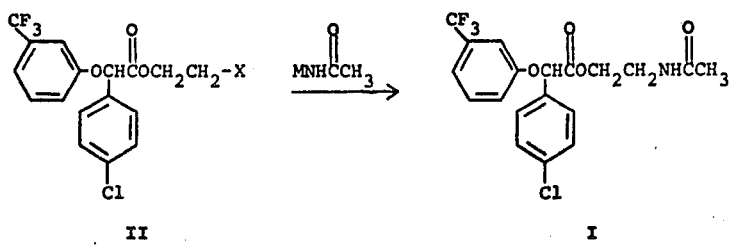

wherein X is halo, for example, chloro, bromo or iodo, a lower alkylsulfonyloxy radical of the formula: RSO$_2$O— wherein R is a lower alkyl radical of from one to four carbon atoms, for example, methylsulfonyloxy, ethylsulfonyloxy, n-propylsulfonyloxy, n-butylsulfonyloxy and the like or a lower alkyl substituted phenylsulfonyloxy radical, for example, 4-methylphenylsulfonyloxy and the like and M is a cation derived from an alkali metal or alkaline earth metal salt such as sodium, lithium, potassium, magnesium and the like.

The 2-substituted ethyl (3-trifluoromethylphenoxy)-(4-chlorophenyl)acetates (II) employed above are conveniently prepared by treating the appropriately substituted hydroxyethyl compound with (3-trifluoromethylphenoxy) (4-chlorophenyl) acetyl chloride (III). Any solvent which is inert or substantially inert to these reactants may be employed, for example, ether, benzene, dichloromethane, hexane and the like. It has been found advantageous to also employ a base, for example, pyridine and the like to react with any hydrochloric acid which may be formed during this reaction. The reaction may be conducted at a temperature in the range of from about −20°C. to 100°C.; however, in general, the reaction is conducted at a temperature in the range of from about 25° to about 30°C. The following equation illustrates this reaction:

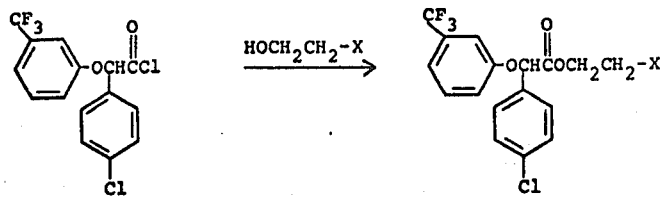

wherein X is as defined above.

2-Acetamidoethyl (3-trifluoromethylphenoxy) (4-chlorophenyl)acetate (I) is a crystalline solid which can be purified by recrystallization from a single solvent or from a mixture of solvents, for example, by recrystallization from a lower alkanol such as methanol, ethanol, isopropanol and the like or from a mixture of these lower alkanols. Also, the product may be recrystallized from a mixture of toluene and hexane.

EXAMPLE 1 2-Acetamidoethyl (3-trifluoromethylphenoxy) (4-chlorophenyl)-Acetate

Step A: 2- (4-Methylphenylsulfonyloxy)ethyl (3-trifluoromethylphenoxyl) (4-chlorophenyl)Acetate (3-Trifluoromethylphenoxy) (4-chlorophenyl)acetic acid (8.47 g., 0.0256 mole) is refluxed for two hours with thionyl chloride (13.1 g., 0.11 mole). The excess thionyl chloride is removed under vacuum to afford (3-trifluoromethylphenoxy) (4-chlorophenyl)acetyl chloride. The acetyl chloride is dissolved in benzene (10 ml.) and added to a solution of β-hydroxyethyl p-toluenesulfonate (5.53 g., 0.0256 mole) and pyridine (2.43 g., 0.0307 mole) in ether (50 ml.). The reaction mixture is stirred for one hour at 25°–30°C. and then extracted successively with a 5% hydrochloric acid solution (25 ml.), a 10% sodium bicarbonate solution (2

× 25 ml.) and water (25 ml.). The ether-benzene layer is dried over sodium sulfate, filtered and the solvent removed to afford 2-(4-methylphenylsulfonyloxy)ethyl (3-trifluoromethylphenoxy) (4-chlorophenyl)acetate.

illustrates the various starting materials and intermediates which may be employed to afford 2-acetamidoethyl (3-trifluoromethylphenoxy) (4-chlorophenyl)acetate.

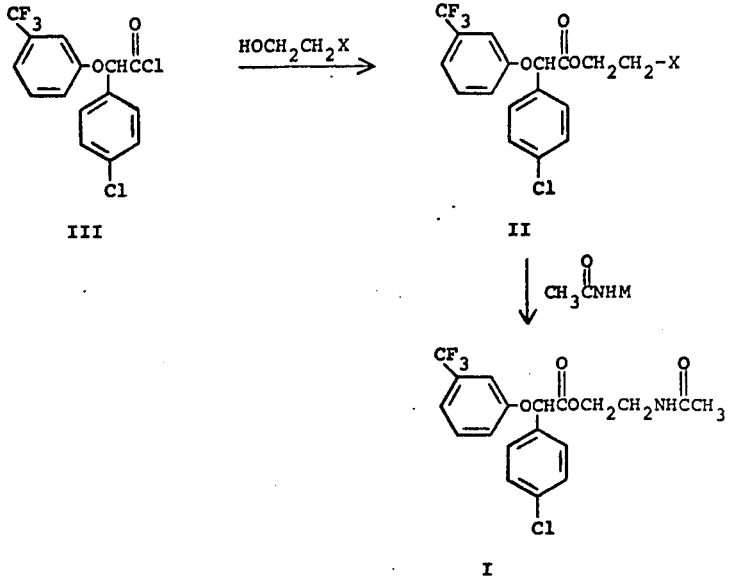

acetate.

Step B: 2-Acetamidoethyl (3-trifluoromethylphenoxy)-(4-chlorophenyl)Acetate

Anhydrous acetamide (1.54 g., 0.026 mole) and sodium iodide (0.39 g., 0.0026 mole) are dissolved in methanol (30 ml.). To this reaction mixture is added sodium methoxide (0.83 g., 0.0256 mole) to afford N-sodioacetamide. This methanolic solution of N-sodioacetamide is then added to 2-(4-methylphenylsulfonyloxy)ethyl (3-trifluoromethylphenoxy) (4-chlorophenyl)acetate and the reaction mixture refluxed overnight. The methanol is removed under vacuum and the residue stirred with benzene (30 ml.). The solution is filtered to remove the inorganic salts and the filtrate diluted with hexane (120 ml.) to afford the crude product. The crude product is recrystallized from isopropanol to afford substantially pure 2-acetamidoethyl (3-trifluoromethylphenoxy) (4-chlorophenyl)acetate, m.p. 93.5°–95.5°C.

By following substantially the procedure described in Example 1, and by substituting for the β-hydroxyethyl p-toluenesulfonate of Step A another suitably substituted hydroxyethyl compound, other 2-substituted ethyl (3-trifluoromethylphenoxy) (4-chlorophenyl)acetates may be prepared which, by following substantially the procedure of Step B of Example 1, will afford 2-acetamidoethyl (3-trifluoromethylphenoxy) (4-chlorophenyl)acetate.

The following equation, taken together with Table I,

TABLE I

| Example No. | X | M |
|---|---|---|
| 2 | Cl | Na |
| 3 | Br | Li |
| 4 | I | K |
| 5 | $CH_3SO_2O-$ | Mg |
| 6 | $C_2H_5SO_2O-$ | Na |
| 7 | $C_3H_7SO_2O-$ | Na |

I claim:
1. A compound of the formula:

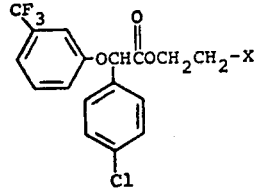

wherein X is lower alkylsulfonyloxy or lower alkyl substituted phenylsulfonyloxy.

2. A compound according to claim 1 wherein X is methylsulfonyloxy, ethylsulfonyloxy, n-propylsulfonyloxy, n-butylsulfonyloxy or 4-methylphenylsulfonyloxy.

3. A compound according to claim 2 wherein X is 4-methylphenylsulfonyloxy.

* * * * *